(12) United States Patent
Eoff

(10) Patent No.: US 12,404,441 B1
(45) Date of Patent: Sep. 2, 2025

(54) ELASTIC CONFORMANCE GELS

(71) Applicant: Halliburton Energy Services, Inc., Houston, TX (US)

(72) Inventor: Larry Steven Eoff, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/672,160

(22) Filed: May 23, 2024

(51) Int. Cl.
*E21B 33/138* (2006.01)
*C09K 8/44* (2006.01)
*E21B 33/12* (2006.01)

(52) U.S. Cl.
CPC ............ *C09K 8/44* (2013.01); *E21B 33/1208* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 4,412,018 A * | 10/1983 | Finlayson | C09K 8/32 556/172 |
| 5,718,841 A * | 2/1998 | Mardis | C11D 1/62 516/34 |
| 6,192,986 B1 | 2/2001 | Urlwin-Smith | |
| 6,258,757 B1 * | 7/2001 | Sweatman | C09K 8/508 507/221 |
| 6,960,617 B2 | 11/2005 | Omidian et al. | |
| 7,776,797 B2 | 8/2010 | Allin et al. | |
| 8,703,659 B2 | 4/2014 | Dalrymple et al. | |
| 9,518,210 B2 | 12/2016 | Ezell et al. | |
| 9,598,631 B2 | 3/2017 | Recio, III et al. | |
| 10,174,241 B2 | 1/2019 | Eoff et al. | |

(Continued)

FOREIGN PATENT DOCUMENTS

| | | |
|---|---|---|
| CN | 104099068 A | 10/2014 |
| CN | 104152123 A | 11/2014 |
| CN | 112250787 A | 1/2021 |

OTHER PUBLICATIONS

CLAYTONE® II Safety Data Sheet; BYK Additives & Instruments; Dec. 23, 2014 (Year: 2014).*

(Continued)

*Primary Examiner* — Andrew Sue-Ako
(74) *Attorney, Agent, or Firm* — Thomas Rooney; C. Tumey Law Group, PLLC

(57) ABSTRACT

Disclosed herein are methods and systems for subterranean zonal isolation, and more particularly to systems and methods of plugging a permeable zone in a wellbore using an elastic sealant composition comprising a cross-linkable polymer, a cross-linking agent, and an elasticity modifier, wherein the elasticity modifier comprises at least one elasticity modifier selected from the group consisting of organophilically-modified clay and/or latex. The elastic sealant compositions may be used for downhole and pipeline applications. For instance, the elastic sealant compositions may be placed into annular space or on top of a packer to seal off fluid flow from water and/or gas zone downhole. The elastic sealant compositions may also be used for pipelines where they may be able to withstand the potential change in diameter without breaking apart. The elastic sealant compositions may be used as pigs for pipelines, for example.

6 Claims, 1 Drawing Sheet

(56) References Cited

U.S. PATENT DOCUMENTS

| | | | |
|---|---|---|---|
| 10,337,282 B2 | 7/2019 | Sierra et al. | |
| 10,703,962 B2 | 7/2020 | Meher et al. | |
| 10,982,126 B2 | 4/2021 | Escobar et al. | |
| 11,091,977 B2 | 8/2021 | Belakshe et al. | |
| 11,261,698 B2 | 3/2022 | Fripp et al. | |
| 11,286,413 B2 | 3/2022 | Belakshe et al. | |
| 11,466,193 B2 | 10/2022 | Beuterbaugh et al. | |
| 11,608,461 B2 | 3/2023 | Eoff et al. | |
| 11,674,367 B2 | 6/2023 | Russell et al. | |
| 11,827,848 B2 | 11/2023 | Shen et al. | |
| 11,920,080 B2 | 3/2024 | Beuterbaugh et al. | |
| 2007/0169937 A1* | 7/2007 | Allin | C09K 8/5083 507/903 |
| 2015/0299557 A1* | 10/2015 | Hussein | C09K 8/512 166/305.1 |
| 2016/0230072 A1 | 8/2016 | Reddy et al. | |
| 2016/0355726 A1 | 12/2016 | Eoff et al. | |
| 2018/0022982 A1 | 1/2018 | Sierra et al. | |
| 2018/0155604 A1* | 6/2018 | Smith | C09K 8/36 |
| 2018/0346787 A1 | 12/2018 | Belakshe et al. | |
| 2018/0362840 A1 | 12/2018 | Meher et al. | |
| 2022/0348817 A1 | 11/2022 | Moradi-Araghi et al. | |
| 2022/0411689 A1 | 12/2022 | Beuterbaugh et al. | |

OTHER PUBLICATIONS

International Search Report and Written Opinion for International Patent Application No. PCT/US2025/020940 dated Jul. 2, 2025. PDF file. 8 pages.

\* cited by examiner

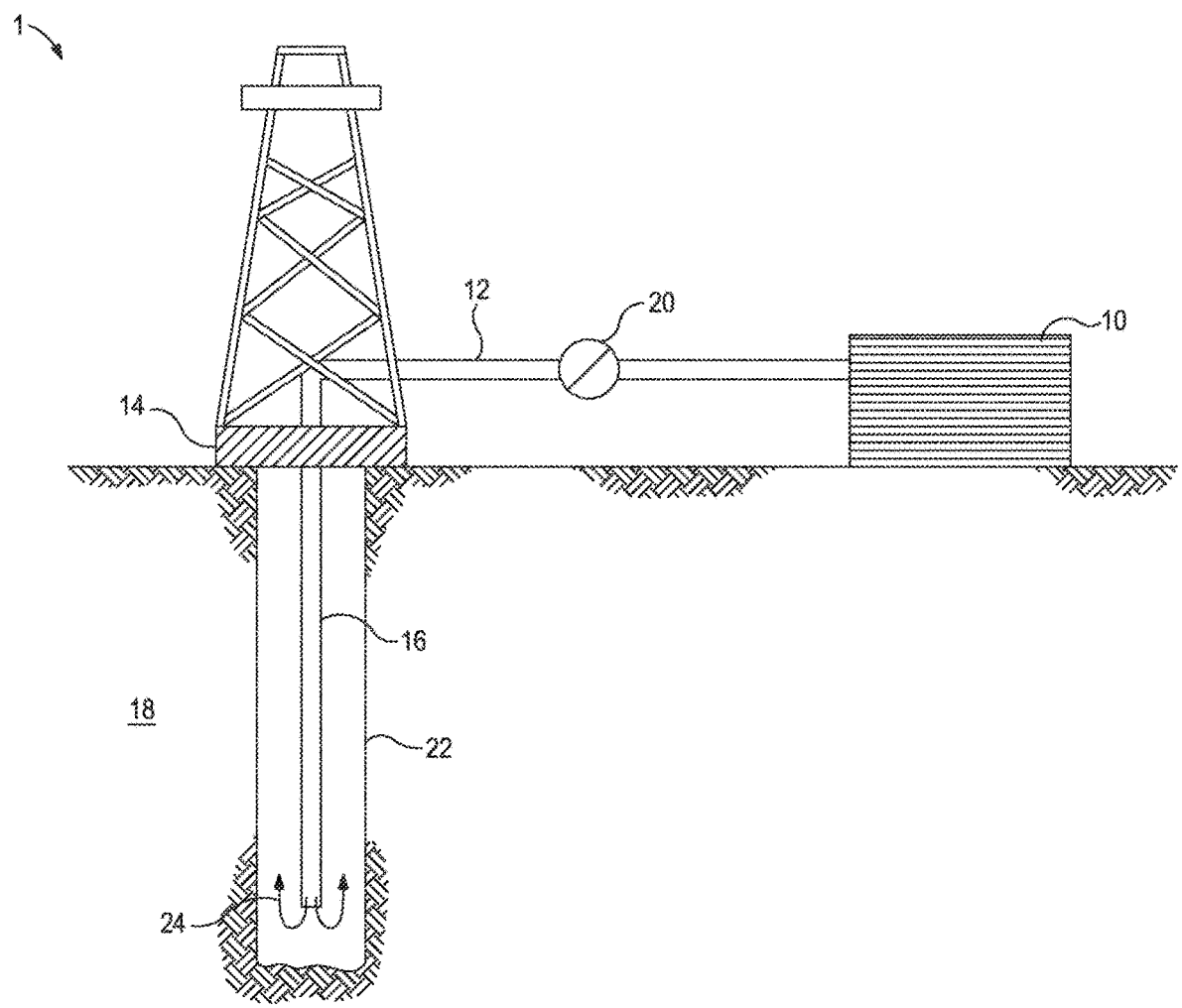

ELASTIC CONFORMANCE GELS

BACKGROUND

Zonal isolation refers to the isolation of a subterranean formation or zone to stop fluid and gas production through the zone. Subterranean formations serve as a source of a natural resources such as oil, gas, or water. A borehole is typically drilled down from the surface to the subterranean formation while circulating a drilling fluid through the borehole. After drilling is terminated, a string of pipe, e.g., casing, is run into the borehole. Next, cementing is performed whereby a cement slurry is placed in an annulus formed between the string of pipe and walls of the borehole and permitted to set into a hard mass, thereby attaching the string of pipe to the walls of the borehole, sealing the annulus, and forming a wellbore through which oil and gas are produced.

It may be necessary over the production life of a well to shut off a producing zone. In industry, polymer gels or gel systems are used for shutting off gas or water production wherein the gels can be placed by bullheading or can be selectively placed through coiled tubing. The main difference from squeeze cementing to shut off is that the polymer gels provide in depth blockage of the formation by penetrating the porous media and crosslinking in-situ therein. The in-situ properties of these gels can be varied from flowing gels to ringing gels by adjusting the polymer concentration, the polymer molecular weight, and/or the type of cross-linker. A limitation of gels is that they may not have the mechanical properties to provide sufficient resistance to flow in the absence of a porous medium, for example in areas such as voids and cavities behind pipe. The polymer gels once set are non-elastic and tend to crumble under compression. The limitations of polymer gels typically preclude them from being used in applications where compressive forces can damage the gels after placement such as in forming pipe-in-pipe annular seals.

BRIEF DESCRIPTION OF THE DRAWINGS

This drawing illustrates certain aspects of some of the embodiments of the present disclosure and should not be used to limit or define the disclosure.

FIGURE depicts an embodiment of a system configured for delivering elastic sealant composition to a downhole location in accordance with some embodiments of the present disclosure.

DETAILED DESCRIPTION

Disclosed herein are methods and systems for subterranean zonal isolation, and more particularly to methods of plugging a permeable zone in a wellbore using an elastic sealant composition comprising a cross-linkable polymer, a cross-linking agent, an elasticity modifier, and a base fluid. The elastic sealant compositions may be used for downhole and pipeline applications. For instance, the elastic sealant compositions may be placed into annular space or on top of a packer to seal off fluid flow from water and/or gas zone downhole. In embodiments, the elastic sealant compositions are capable of withstanding repeated temperature and/or pressure cycling. The elastic sealant compositions may also be used for pipelines where they may be able to withstand the potential change in diameter without breaking apart. The elastic sealant compositions may be used as pigs for pipelines, for example.

In embodiments, the cross-linkable polymer includes copolymers formed from the co-polymerization of one or more ethylene polar monomers and one or more ethylene ester monomers. The ethylene polar monomers may be ethylenically saturated or unsaturated polar monomers. The ethylene ester monomers may be saturated or unsaturated ester monomers. The cross-linkable copolymer may be a block or non-block copolymer, including a random copolymer or a graft copolymer.

In embodiments, ethylenically unsaturated polar monomers include monomers where the unsaturated group is vinyl or alpha methyl vinyl. In further embodiments, the ethylenically unsaturated polar monomers are derived from an unsaturated carboxylic acid such as a primary, secondary or tertiary amide thereof. The amide may be derived from ammonia and/or a C1 to C10 primary alkylamine or a C1 to C10 secondary alkylamine. In embodiments the amine is substituted by at least one hydroxyl group to form an ethanolamide. Some examples of suitable ethylenically unsaturated polar monomers include, without limitation, acrylamide, methacrylamide, acrylic ethanol amide, a vinyl heterocyclic compound with at least O, S or N atom in a ring with 3 to 8 carbon atoms, such as N-vinyl-pyrrolidone, -caprolactam, and vinyl pyridine. In embodiments, the cross-linkable copolymer includes the ethylenically unsaturated polar monomer in an amount at a point in a range of from 1 mol. % to 90 mol. %. Alternatively, in an amount at a point in a range of from 1 mol. % to 25 mol. %, in an amount at a point in a range of from 25 mol. % to 50 mol. %, in an amount at a point in a range of from 50 mol. % to 90 mol. %, or in an amount at a point in a range of any subranges therebetween.

In embodiments, the ethylenically unsaturated ester monomers include monomers derived from a hydroxyl compound and an ethylenically unsaturated carboxylic acid. The ethylenically unsaturated group on the carboxylic acid may be in the alpha-beta or beta-gamma position relative to the carboxyl group. In embodiments, the carboxylic acid includes 3-20 carbon atoms. In embodiments the carboxylic acid includes alkenoic and aralkenoic acids with 3 to 6 or 9 to 12 carbon atoms. Examples of suitable acids include, but are not limited to, acrylic, methacrylic, crotonic, and cinnamic acids. In embodiments, the hydroxyl compound includes an alcohol and may be of formula ROH. where R is a C1 to C30 hydrocarbyl group. In embodiments the hydrocarbyl group includes C1-C30 alkyl groups, C2-C20 alkenyl groups, C5-C8 cycloalkyl, aryl groups such as aromatic hydrocarbyl groups having 6 to 20 carbon atoms, and aralkyl groups of 7 to 24 carbon atoms. Specific examples of R groups include methyl, ethyl, propyl, butyl, amyl, hexyl, octyl, 2-ethylhexyl and decyl, allyl, cyclohexyl, palmityl, stearyl, phenyl and benzyl. The R group may also be a hydrocarbyl group substituted by at least one of hydroxyl, ether, or thio ether groups. The hydroxyl compound may be a primary, secondary, iso or tertiary compound, such as a tertiary carbon atom bonded to the hydroxyl group including tert-butyl and trityl. The R group may also comprise a heterocyclic group either for bonding directly to the hydroxyl group of ROH or separated therefrom by an alkylene group such as by 1 to 4 carbon atoms. Thus, the R group may be a saturated or unsaturated heterocyclic or heterocyclic alkylene group including 3 to 8 carbon atoms and at least one or two ring heteroatoms selected from O, N and S. Examples of such groups are furyl, tetrahydrofuryl, furfuryl and tetrahydrofurfuryl, pyranyl and tetrahydropyranyl. In embodiments, the R groups are selected from tert-butyl, trityl, methoxymethyl, benzyloxymethyl and tetrahydropyranyl, stearyl, isopropyl, ethyl and methyl. In embodiments, the ester is t-butyl ester. In further embodiments, the ethylenically unsaturated ester may also be derived from a hydroxyl compound of formula ROH and an ethylenically unsaturated sulphonic or C2-C20 phosphoric acid. In embodiments the phosphoric acid includes alkenyl acids such as vinyl sulphonic acid and vinyl phosphonic acid. In embodiments the ester may be methyl or ethyl vinyl sulphonate or phosphonate. In embodiments the ester may be derived from an acid containing an ethylenically unsaturated carboxamide such as an acrylamido group. In embodiments, the cross-linkable copolymer includes the ethylenically unsaturated ester monomers in an amount at a point in a range of from 1 mol. % to 50 mol. %. Alternatively, in an amount at a point in a range of from 1 mol. % to 15 mol. %, in an amount at a point in a range of from 15 mol. % to 35 mol. %, in an amount at a point in a range of from 35 mol. % to 50 mol. %, or in an amount at a point in a range of any subranges therebetween.

In embodiments, examples of cross-linkable polymers for use in the elastic sealant compositions described herein many include, but are not limited to, a polyacrylamide, an acrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyketone, an acrylamide/t-butyl acrylate copolymer, any derivative thereof, and any combination thereof.

In embodiments, the elastic sealant compositions include the cross-linkable polymers at a point in a range of from 1 vol. % to 25 vol. %. Alternatively, in an amount at a point in a range of from 1 vol. % to 5 vol. %, in an amount at a point in a range of from 5 vol mol. % to 10 vol. %, in an amount at a point in a range of from 10 vol. % to 15 vol. %, in an amount at a point in a range of from 15 vol. % to 25 vol. %, or in an amount at a point in a range of any subranges therebetween.

The cross-linking agents for use in the elastic sealant composition described herein may be any cross-linking agent capable of undergoing a crosslinking reaction with the cross-linkable copolymer. Under wellbore conditions, the cross-linking agent may react with one or more cross-linkable copolymers included in the elastic sealant composition so as to form a gel. In embodiments, the cross-linking agents may include, but are not limited to, any metal crosslinkers including chromium, zinc, iron, and any combination thereof. In some embodiments, the cross-linking agents may include, but are not limited to, an amine-containing polymer, an amine-containing copolymer, and any combination thereof. Suitable examples of cross-linking agents for use in the embodiments described herein may include, but are not limited to, a polyalkyleneimine such as polyethyleneimine, a polyalkylenepolyamine, a polyfunctional aliphatic amine, an arylalkylamine, a heteroarylalkylamine, a chitosan, a polylysine, a vinyl alcohol/vinylamine copolymer, a partially hydrolyzed polyvinyl formamide, any derivative thereof, and any combination thereof. As used herein, the term "derivative" refers to any compound that is made from one of the listed compounds by replacing one atom in one of the listed compounds with another atom or group of atoms, ionizing one of the listed compounds, or creating a salt of one of the listed compounds.

In embodiments, the elastic sealant compositions include the cross-linking agent in an amount at a point in a range of from 0.1 vol. % to 15 vol. %. Alternatively, in an amount at a point in a range of from 0.1 vol. % to 10 vol. %, in an amount at a point in a range of from 0.1 vol. % to 1 vol. %, in a range of from 1 vol mol. % to 5 vol. %, in an amount at a point in a range of from 5 vol. % to 10 vol. %, in an amount at a point in a range of from 10 vol. % to 15 vol. %, or in an amount at a point in a range of any subranges therebetween.

In embodiments, the elastic sealant compositions include an elasticity modifier. In embodiments, the elasticity modifier includes a latex. A latex herein refers to any number of polymeric materials commonly known as a "polymer emulsion," that includes a water emulsion of a rubber or plastic obtained by polymerization. In an embodiment, the latex comprises a naturally-occurring material. Alternatively, the latex comprises a synthetic material. Alternatively, the latex comprises a mixture of a naturally-occurring and a synthetic material. Latexes suitable for use in elastic sealant compositions may be in the form of an emulsion comprising an aqueous medium with liquid or solid polymer particles dispersed therein. In an embodiment, a latex suitable for use in the elastic sealant compositions is in the form of an emulsion comprising about 50% of an aqueous component, alternatively from about 30% to about 70% or alternatively from about 40% to about 60% based on the total weight of the emulsion. In an embodiment, the latex comprises a polymer. In an embodiment, the latex polymer comprises isoprene, styrene, acrylonitrile, butadiene, or combinations thereof. In an embodiment, the latex polymer comprises a styrene copolymer dispersed in water to form an aqueous emulsion. In an embodiment, the weight ratio of the styrene to a co-monomer (e.g., butadiene) is about 1:99, alternatively about 10:90, alternatively about 20:80, alternatively about 30:70, alternatively about 40:60, alternatively about 50:50, alternatively about 60:40, alternatively about 70:30, alternatively about 80:20, alternatively about 90:10, alternatively about 99:1. Alternatively, in an embodiment, the latex comprises 100% styrene. In an embodiment, the latex comprises an alkali swellable latex. Alkali swellable latex includes as a latex emulsion that, when exposed to pH-increasing materials, may swell and exhibit an increase in viscosity. Alkali swellable latexes typically contain, in addition to typical latex-forming monomers, other monomers having acidic groups capable of reacting with pH increasing materials, thereby forming anionic pendant groups on the polymer back bone. Examples of typical latex-forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

In an embodiment, the latex comprises a cationic latex. In an embodiment, the cationic latexes comprise latex-forming monomers and positively charged monomers. Nonlimiting examples of latex-forming monomers suitable for use in the elastic sealant compositions include vinyl aromatic monomers (e.g., styrene based monomers), ethylene, butadiene, vinylnitrile (e.g., acrylonitrile), olefinically unsaturated esters of $C_1$-$C_8$ alcohols, non-ionic monomers that exhibit steric effects and that contain ethoxylate or hydrocarbon tails, or combinations thereof. In embodiments the latex polymer is synthesized from monomers containing quaternary ammonium groups, trimethylaminopropylmethacrylamide bromide, monomers containing other-onium species, such as trialkylsulfonium or tetraalkylphosphonium structures, protonated tertiary amines, or combinations thereof. In an embodiment, the positively charged monomer comprises dimethylaminomethacrylamide, which when polymerized in an acidic medium become cationic by protonation of amine nitrogen. In an embodiment, the latex may comprise at least one polar monomer and at least one elasticity-enhancing monomer. According to certain embodiments, the latex further comprises at least one stiffness-enhancing monomer. In embodiments the polar monomer may comprise vinylamine, vinyl acetate, acrylonitrile, or acid, ester, amide, or salt forms of acrylates, such as acrylic acid, and the elasticity-enhancing monomer may be selected from ethylene, propylene, butadiene, 1,3-hexadiene or isoprene. In the embodiments that include a stiffness-enhancing monomer, the stiffness-enhancing monomer may comprise styrene, t-butylstyrene, α-methylstyrene, sulfonated styrene or combinations thereof.

In embodiments, the elasticity modifier includes an organophilically-modified clay. The organophilically-modified clay can be any clay that has a hydrophilic character defined as being an at least partially hydrophilic clay or a hydrophilic clay. The organophilically-modified clay can include any suitable one or more clays. In embodiments, the organophilically-modified clay can include at least one of a kaolinite, nacrite, dickite, halloysite, montmorillonite, montmorillonite-smectite, bentonite, saponite, nontronite, hectorite, sauconite, illite hydrobiotite, glauconite, bramallite, chlorite, chamosite, vermiculite, attapulgite, sepiolite, and combinations thereof.

The organophilic-modification of the clay can be any suitable organophilic modification that renders the clay more hydrophobic than a corresponding clay not having the organophilic modification or having less of the organophilic modification. The organophilic modification can be a surface modification, or a modification that occurs in non-surface regions as well. The organophilic modification can be an ion exchange with cationic surfactants having hydrophobic or organophilic groups. The organophilic modification can be an electrostatic attachment of the surfactant. The organophilic modification can be at least one of cationic substitution, physisorption having substantially no change in bonds, and chemisorption such as a change in bonds. A cation can replace other cations in the clay to form the organophilic modification. An anion can coordinate to one or more cations in the clay to form the organophilic modification.

The organophilically-modified clay can include at least one organophilic-modification compound or an ion thereof (e.g., the organophilic modification compound is a salt or a pair of ions that form a charge-neutral compound and the clay includes at least one ion from the salt). In various embodiments, the organophilic-modification compound is at least one of a substituted or unsubstituted ($C_{10}$-$C_{50}$) fatty acid or a salt thereof, a tri- or tetra-($C_1$-$C_{50}$)hydrocarbylammonium salt, and a tri- or tetra-($C_1$-$C_{50}$)hydrocarbylphosphonium salt, wherein each ($C_1$-$C_{50}$)hydrocarbyl is independently selected, is substituted or unsubstituted, and is interrupted by 0, 1, 2, or 3 atoms chosen from —O—, —S—, and substituted or unsubstituted —NH—, or any combination thereof. The organophilic-modification compound can include a ($C_{10}$-$C_{50}$) fatty acid salt, such as magnesium stearate and zinc stearate. The organophilic-modification compound can include at least one of a tri- or tetra-($C_1$-$C_{50}$)hydrocarbylammonium salt, and a tri- or tetra-($C_1$-$C_{50}$)alkyl- or alkenylphosphonium salt, wherein each ($C_1$-$C_{50}$)hydrocarbyl is independently selected. The organophilic-modification compound can include at least one of a trimethyl stearyl ammonium salt, dodecyltrimethylammonium bromide, hexadecyltrimethylammonium bromide, tetradecyltrimethylammonium bromide, and tetraphenylphosphonium bromide.

In embodiments, the least one organophilic-modification compound or ion thereof can be any suitable proportion of the organophilically-modified clay, such as in an amount at a point in a range of from 0.01 wt. % to about 80 wt. % of the organophilically-modified clay. Alternatively in an amount at a point in a range of from 0.01 wt. % to 10 wt. %, in an amount at a point in a range of from 10 wt. % to 50 wt %, in an amount at a point in a range of from 50 wt. % to 80 wt. %, or in an amount at a point in a range of any subranges therebetween.

In embodiments, the elastic sealant compositions include the organophilically-modified clay and/or the latex such as in an amount at a point in a range of from 0.1 wt. % to about 80 wt. % of the sealant compositions. Alternatively in an amount at a point in a range of from 0.1 wt. % to 1 wt. %, in an amount at a point in a range of from 1 wt. % to 10 wt. %, in an amount at a point in a range of from 10 wt. % to 50 wt %, in an amount at a point in a range of from 50 wt. % to 80 wt. %, or in an amount at a point in a range of any subranges therebetween.

In embodiments, the base fluid for use in the elastic sealant compositions may be any aqueous base fluid suitable for use in a subterranean formation, provided that it does not adversely interfere with the elastic sealant compositions. Suitable aqueous based fluids may include, but are not limited to, fresh water, saltwater (e.g., water containing one or more salts dissolved therein), brine (e.g., saturated salt water), seawater, formation water, produced water, and any combination thereof. Generally, the aqueous base fluid may be from any source, provided that it does not contain components that may adversely interfere with the elastic sealant compositions described herein. Brines for use as the aqueous base fluid may be formulated or manufactured by dissolving one or more soluble salts in fresh water, a natural brine, or seawater. Representative soluble salts may include, but are not limited to, chloride, bromide, acetate, a formate salt of potassium, a formate salt of sodium, a formate salt of calcium, a formate salt of magnesium, a formate salt of zinc, and any combination thereof.

In embodiments, the elastic sealant compositions include the base fluid in an amount at a point in a range of from 50 vol. % to 99 vol. %. Alternatively, in an amount at a point in a range of from 50 vol. % to 65 vol. %, in an amount at a point in a range of from 65 vol mol. % to 85 vol. %, in an amount at a point in a range of from 85 vol. % to 99 vol. %, or in an amount at a point in a range of any subranges therebetween.

The elastic sealant compositions may be used downhole to plug a hole in a production tubing, to plug a hole in a casing, or to plug an abandoned well, for example. The elastic sealant compositions may be used in combination with cement.

Further, the elastic sealant compositions may be placed in an annular space or on top of a packer to seal off fluid flow for water or gas shut off. In addition, the elastic sealant compositions may be used at surface to form pipe-in-pipe annular seals in pipeline especially where changes in pipe diameter may cause sealing issue. For example, the elastic sealant compositions have enough elasticity to squeeze from a pipe with a large diameter to a pipe with a lower diameter and to expand back to a pipe with a larger diameter without breaking apart.

The sealing compositions for water-based conformance gels may be stable at temperatures from about 40° F. (4° C.) up to about 400° F. (200° C.) or from about 60° F. (15° C.) up to about 350° F. (175° C.), for example. Further, the elastic sealant compositions be degradable so that flow from a reservoir compartment may be reestablished. Degradation of the elastic sealant compositions may be triggered chemically, mechanically, changing the temperature locally, changing the pressure locally, or any combinations thereof.

FIGURE shows an illustrative schematic of a system that can deliver elastic sealant compositions to a downhole location, according to one or more embodiments. It should be noted that while FIGURE generally depicts a land-based system, it is to be recognized that like systems may be operated in subsea locations as well. As depicted in FIGURE, system 1 may include mixing tank 10, in which an elastic sealant compositions may be formulated. Again, in some embodiments, the mixing tank 10 may represent or otherwise be replaced with a transport vehicle or shipping container configured to deliver or otherwise convey the elastic sealant compositions to the well site. The elastic sealant compositions may be conveyed via line 12 to wellhead 14, where the elastic gelled sealant composition enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the elastic sealant compositions may subsequently return up the wellbore 22 in the annulus between the tubular 16 and the wellbore 22 as indicated by flow lines 24. In other embodiments, the elastic sealant compositions may be reverse pumped down through the annulus and up tubular 16 back to the surface, without departing from the scope of the disclosure. Pump 20 may be configured to raise the pressure of the elastic gelled sealant composition to a desired degree before its introduction into tubular 16 (or annulus). It is to be recognized that system 1 is merely exemplary in nature and various additional components may be present that have not necessarily been depicted in FIG. 1*n* the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Accordingly, the present disclosure may provide methods, systems, and apparatus that may relate elastic sealant compositions. The methods, systems. and apparatus may include any of the various features disclosed herein, including one or more of the following statements.

Statement 1. An elastic sealant composition comprising: a cross-linkable polymer; a cross-linking agent; and an elasticity modifier, wherein the elasticity modifier comprises at least one elasticity modifier selected from the group consisting of organophilically-modified clay and/or latex.

Statement 2. The composition of Statement 1, wherein the cross-linkable polymer comprises copolymers formed from the co-polymerization of one or more ethylene polar monomers and one or more ethylene ester monomer.

Statement 3. The composition of Statement 1 or Statement 2, wherein the cross-linkable polymer comprises at least one cross-linkable polymer selected from the group consisting of polyacrylamide, an acrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyketone, an acrylamide/t-butyl acrylate copolymer, and any combinations thereof.

Statement 4. The composition of any one of Statements 1-3, wherein the cross-linking agent is selected from the group consisting of an amine-containing polymer, any copolymer thereof, and any combination thereof.

Statement 5. The composition of any one of Statements 1-4, wherein the cross-linking agent is selected from the group consisting of polyalkyleneimine, polyalkylenepolyamine, polyfunctional aliphatic amine, arylalkylamine, heteroarylalkylamine, chitosan, polylysine, vinyl alcohol/vinylamine copolymer, partially hydrolyzed polyvinyl formamide, and any combination thereof.

Statement 6. The composition of any one of Statements 1-5, wherein the organophilically-modified clay comprises an organophilic-modification compound selected from the group consisting of substituted or unsubstituted ($C_{10}$-$C_{50}$) fatty acid or a salt thereof, tri- or tetra-($C_1$-$C_{50}$)hydrocarbylammonium salt, tri- or tetra-($C_1$-$C_{50}$)hydrocarbylphosphonium salt, and combinations thereof, and wherein each tri- or tetra-($C_1$-$C_{50}$) hydrocarbylammonium salt, and tri- or tetra-($C_1$-$C_{50}$) hydrocarbylphosphonium salt is independently selected, is substituted or unsubstituted, and is interrupted by 0, 1, 2, or 3 atoms chosen from at least one of —O—, —S—, substituted or unsubstituted —NH—, or combinations thereof.

Statement 7. The composition of any one of Statements 1-6, wherein the latex comprises a polymer formed from at least one monomer selected from the group consisting of vinyl aromatic monomers, ethylene, butadiene, vinylnitrile, olefinically unsaturated esters of $C_1$-$C_8$ alcohol, carboxylated styrene butadiene, and combinations thereof.

Statement 8. The composition of any one of Statements 1-7, further comprising an aqueous fluid, wherein the aqueous fluid comprises at least one aqueous fluid selected from the group consisting of tap water, produced water, brine, seawater, and any combination thereof.

Statement 9. A method of sealing off fluid flow comprising: introducing a treatment fluid in a subterranean formation, wherein the treatment fluid comprises: a cross-linkable polymer; a cross-linking agent; and at least one additive, wherein the additive comprises at least one additive selected from the group consisting of organophilically-modified clay and/or latex.

Statement 10. The method of Statement 9, wherein the a cross-linkable polymer is selected from the group consisting of an acrylamide-based polymer, any copolymer thereof, and any combinations thereof.

Statement 11. The method of Statement 9 or Statement 10, wherein the cross-linkable polymer comprises at least one cross-linkable polymer selected from the group consisting of polyacrylamide, an acrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyketone, an acrylamide/t-butyl acrylate copolymer, and any combinations thereof.

Statement 12. The method of any one of Statements 9-11, wherein the cross-linking agent is selected from the group consisting of an amine-containing polymer, any copolymer thereof, and any combination thereof.

Statement 13. The method of any one of Statements 9-12, wherein the cross-linking agent is selected from the group consisting of polyalkyleneimine, polyalkylenepolyamine, polyfunctional aliphatic amine, arylalkylamine, heteroarylalkylamine, chitosan, polylysine, vinyl alcohol/vinylamine copolymer, partially hydrolyzed polyvinyl formamide, and any combination thereof.

Statement 14. The method of any one of Statements 9-13, wherein the organophilically-modified clay comprises an organophilic-modification compound selected from the group consisting of substituted or unsubstituted ($C_{10}$-$C_{50}$) fatty acid or a salt thereof, tri- or tetra-($C_1$-$C_{50}$)hydrocarbylammonium salt, tri- or tetra-($C_1$-$C_{50}$) hydrocarbylphosphonium salt, and combinations thereof, and wherein each tri- or tetra-($C_1$-$C_{50}$)hydrocarbylammonium salt, and tri- or tetra-($C_1$-$C_{50}$)hydrocarbylphosphonium salt is independently selected, is substituted or unsubstituted, and is interrupted by 0, 1, 2, or 3 atoms chosen from at least one of —O—, —S—, substituted or unsubstituted —NH—, or combinations thereof.

Statement 15. The method of any one of Statements 9-14, wherein the latex comprises a polymer formed from at least one monomer selected from the group consisting of vinyl aromatic monomers, ethylene, butadiene, vinylnitrile, olefinically unsaturated esters of $C_1$-$C_8$ alcohol, carboxylated styrene butadiene, and combinations thereof.

Statement 16. The method of any one of Statements 9-15, wherein the treatment fluid further comprises an aqueous fluid, wherein the aqueous fluid comprises at least one aqueous fluid selected from the group consisting of tap water, produced water, brine, seawater, and any combination thereof.

Statement 17. A method of sealing off pipe-in-pipe connection in a pipeline comprising: introducing a treatment fluid in the pipeline, wherein the treatment fluid comprises: a cross-linkable polymer; a cross-linking agent; and at least one additive, wherein the additive comprises at least one additive selected from the group consisting of organophilically-modified clay and/or latex.

Statement 18. The method of Statement 17, wherein the cross-linkable polymer comprises at least one cross-linkable polymer selected from the group consisting of polyacrylamide, an acrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyketone, an acrylamide/t-butyl acrylate copolymer, and any combinations thereof.

Statement 19. The method of Statement 17 or Statement 18, wherein the cross-linking agent is selected from the group consisting of polyalkyleneimine, polyalkylenepolyamine, polyfunctional aliphatic amine, arylalkylamine, heteroarylalkylamine, chitosan, polylysine, vinyl alcohol/vinylamine copolymer, partially hydrolyzed polyvinyl formamide, and any combination thereof.

Statement 20. The method of any one of Statements 17-19, wherein the organophilically-modified clay comprises an organophilic-modification compound selected from the group consisting of substituted or unsubstituted ($C_{10}$-$C_{50}$) fatty acid or a salt thereof, tri- or tetra-($C_1$-$C_{50}$)hydrocarbylammonium salt, tri- or tetra-($C_1$-$C_{50}$)hydrocarbylphosphonium salt, and combinations thereof, and wherein each tri- or tetra-($C_1$-$C_{50}$)hydrocarbylammonium salt, and tri- or tetra-($C_1$-$C_{50}$)hydrocarbylphosphonium salt is independently selected, is substituted or unsubstituted, and is interrupted by 0, 1, 2, or 3 atoms chosen from at least one of —O—, —S—, substituted or unsubstituted —NH—, or combinations thereof and wherein the latex comprises a polymer formed from at least one monomer selected from the group consisting of vinyl aromatic monomers, ethylene, butadiene, vinylnitrile, olefinically unsaturated esters of $C_1$-$C_8$ alcohol, and combinations thereof.

To facilitate a better understanding of the present invention, the following examples of certain aspects of some embodiments are given. In no way should the following examples be read to limit, or define, the entire scope of the disclosure.

EXAMPLES

The mechanical strength and elasticity of example embodiments of the disclosed sealant compositions was tested by preparing and curing a plurality of test compositions in a 1-inch inner diameter tube and adding weight to the resultant cured plug.

A first test using organophilic clay as additive was conducted. A plurality of test compositions (test1-test 13) were prepared according to Table 1 and cured at 90° F. for a varying number of days of cure time. In Table 1, copolymer (CP) is a polyacrylamide and crosslinker (CL) is a polyethylenimine polymer cross-linking agent. Additionally, the test compositions were prepared with varying levels of additives including polysaccharide, crystalline silica, organophilic clay 1, organophilic clay 2, and organophilic clay 3. After curing, weight was added to the cured plug and the resistance to breaking was recorded. The results of the tests are shown in Table 2. It was observed that some of the test compositions did not break while some test compositions were crumbly after curing. For samples that broke, the first number is the weight the plug held and the second is weight where the plug broke.

A second test was conducted using latex as an additive. A plurality of test compositions (test 14-test 21) were prepared according to Table 3 using a carboxylated styrene-butadiene emulsion (latex 1) and cured at 90° F. for a varying number of days cure time. In Table 3, In Table 1, copolymer (CP) is a polyacrylamide copolymer and crosslinker (CL) is a polyethylenimine polymer cross-linking agent. After curing, weight was added to the cured plug and the resistance to breaking was recorded. The results of the tests are shown in Table 3. It was observed that the test compositions which did not include latex 1 broke after curing and weight testing. For samples that broke, the first number is the weight the plug held and the second is weight where the plug broke.

A third test was conducted using a variety of latexes. A plurality of test compositions (test 22-test 34) were prepared according to Table 4 and cured at 90° F. and room temperature (RT) for a varying number of days of cure time. In Table 4, copolymer (CP) is a polyacrylamide copolymer. In table 4, MZ is chromium acetate, latex 1 is a carboxylated styrene-butadiene emulsion, latex 2 is an acrylic polymer emulsion, latex 3 is a styrene-acrylic polymer emulsion, latex 4 is a carboxylated styrene-butadiene emulsion, latex 5 is a carboxylated styrene-butadiene emulsion, latex 3000 is styrene/butadiene. After curing, weight was added to the cured plug and the resistance to breaking was recorded. The results of the tests are shown in Table 4. For samples that broke, the first number is the weight the plug held and the second is weight where the plug broke.

TABLE 1

| Test # | cure time (days) | cure Temp (° F.) | CP (gpt) | CL (gpt) | Water (gpt) | Additive 1 | Additive 1% | Additive 2 | Additive 2% |
|---|---|---|---|---|---|---|---|---|---|
| 1 | 1 | 90 | 350 | 20 | 630 | — | — | — | — |
| 2 | 4 | 90 | 350 | 100 | 550 | polysaccharide | 50 ppt | crystalline silica | 40% |
| 3 | 6 | 90 | 350 | 100 | 550 | polysaccharide | 50 ppt | crystalline silica | 20% |
| 4 | 1 | 90 | 350 | 20 | 630 | organophilic clay 1 | 20% w/v | — | — |
| 5 | 1 | 90 | 350 | 20 | 630 | organophilic clay 1 | 40% w/v | — | — |
| 6 | 1 | 90 | 350 | 80 | 570 | — | — | — | — |
| 7 | 1 | 90 | 350 | 80 | 570 | organophilic clay 1 | 20% w/v | — | — |
| 8 | 3 | 90 | 500 | 200 | 300 | — | — | — | — |
| 9 | 3 | 90 | 500 | 200 | 300 | organophilic clay 1 | 10% w/v | — | — |
| 10 | 3 | 90 | 500 | 200 | 300 | organophilic clay 1 | 20% w/v | — | — |
| 11 | 3 | 90 | 500 | 200 | 300 | organophilic clay 1 | 40% w/v | — | — |
| 12 | 1 | 90 | 500 | 200 | 300 | organophilic clay 2 | 40% w/v | — | — |
| 13 | 1 | 90 | 500 | 200 | 300 | organophilic clay 3 | 40% w/v | — | — |

TABLE 2

| Test # | Grams weight added to plug | Sample Break? | Grams to 50% compression | Observation |
|---|---|---|---|---|
| 1 | 1100-1300 | Yes | | |
| 2 | 10156 | Yes | 4212 | |
| 3 | 10156 | Yes | 3148 | |
| 4 | 7412 | No | | |
| 5 | 7404-10156 | Yes | | Soft |
| 6 | 750-1000 | Yes | | |
| 7 | 7412 | No | | Did not flatten |
| 8 | 4213-5200 | Yes | | Very crumbly |
| 9 | 7945-10156 | Yes | | Very crumbly |
| 10 | 10156 | No | | Did not flatten |
| 11 | 10156 | No | 4632 | Did not flatten but had slow rebound |
| 12 | 10156 | No | 5620 | Held 5200 for several minutes with full recovery |
| 13 | 10156 | No | 5620 | Held 5200 for several minutes with full recovery |

TABLE 3

| Test # | time (days) | Temp | CP (gpt) | CL (gpt) | water | latex 1 (gpt). | Grams weight added to plug | Sample Break? | 50% compression |
|---|---|---|---|---|---|---|---|---|---|
| 14 | 1 | 90 | 350 | 20 | 630 | | 1100-1300 | Yes | — |
| 15 | 1 | 90 | 500 | 40 | 460 | — | 2100-2200 | Yes | — |
| 16 | 1 | 90 | 500 | 80 | 460 | — | 4212-5200 | Yes | — |
| 17 | 1 | 90 | 500 | 114 | 386 | — | 5200-6248 | Yes | — |
| 18 | 3 | 90 | 500 | 200 | 300 | — | 4213-5200 | Yes | — |
| 19 | 1 | 90 | 500 | 100 | 300 | 100 gpt | 4212-5200 | Yes | — |
| 20 | 1 | 90 | 500 | 100 | — | 400 gpt | 10156 | No | 3568 |
| 21 | | 90 | 500 | 50 | — | 450 gpt | 10156 | No | 785 |

TABLE 4

| Test # | time (days) | Temp | CP (gpt) | water | Additive 1 | Additive 1 | Additive 2 | Additive 2 |
|---|---|---|---|---|---|---|---|---|
| 22 | 1 | 90 | 500 | 490 | MA | 10 gpt | — | — |
| 23 | 4 | 90 | 500 | 390 | Latex 2 | 100 gpt | MZ | 10 gpt |
| 24 | 4 | 90 | 500 | 390 | Latex 3 | 100 gpt | MZ | 10 gpt |
| 25 | 4 | 90 | 500 | 390 | Latex 4 | 100 gpt | MZ | 10 gpt |
| 26 | 4 | 90 | 500 | 390 | Latex 5 | 100 gpt | MZ | 10 gpt |
| 27 | 1 | 90 | 500 | 390 | Latex 3000 | 100 gpt | MZ | 10 gpt |
| 28 | 1 | 90 | 500 | — | Latex 3000 | 490 gpt | MZ | 10 gpt |
| 29 | 1 | 90 | 500 | — | Latex 4 | 490 gpt | MZ | 10 gpt |
| 30 | 1 | 90 | 500 | — | Latex 5 | 490 gpt | MZ | 10 gpt |
| 31 | 1 | 90 | 390 | — | Latex 3 | 600 | MZ | 10 gpt |
| 32 | 1 | 90 | 390 | — | Latex 1 | 600 | MZ | 10 gpt |
| 33 | 5 | RT | 290 | — | Latex 1 | 700 | MZ | 10 gpt |
| 34 | 5 | RT | 190 | — | Latex 1 | 800 | MZ | 10 gpt |

TABLE 5

| Test # | Grams weight added to plug | Sample Break? | 50% compression |
|---|---|---|---|
| 22 | 5200/6348 | Yes | 420 |
| 23 | 5200/6348 | Yes | 1032 |
| 24 | 5200/7412 | Yes | 1355 |
| 25 | 5200/7945 | Yes | 1238 |
| 26 | 10156 | No | 1098 |
| 27 | 10156 | No | 542 |
| 28 | 10156 | No | 578 |
| 29 | 10156 | No | 1110 |
| 30 | 10156 | No | 2085 |
| 31 | 10156 | No | 797 |
| 32 | 10156 | No | 1132 |
| 33 | 10156 | No | 1180 |
| 34 | 10156 | No | 1670 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of sealing off fluid flow comprising:
   introducing a treatment fluid in a subterranean formation, wherein the treatment fluid comprises:
   a cross-linkable polymer;
   a cross-linking agent; and
   at least one additive, wherein the additive comprises an organophilically-modified clay, wherein the organophilically-modified clay comprises tri- or tetra-($C_1$-$C_{50}$)hydrocarbylammonium salt, and wherein each tri- or tetra-($C_1$-$C_{50}$) hydrocarbylammonium salt is independently selected, is substituted or unsubstituted, and is interrupted by 1, 2, or 3 atoms chosen from at least of —O—, —S—, substituted or unsubstituted —NH—, or combinations thereof.

2. The method of claim 1, wherein the cross-linkable polymer comprises copolymers formed from the co-polymerization of one or more ethylene polar monomers and one or more ethylene ester monomer.

3. The method of claim 1, wherein the cross-linkable polymer comprises polyacrylamide.

4. The method of claim 1, wherein the cross-linking agent is selected from the group consisting of an amine-containing polymer, any copolymer thereof, and any combination thereof.

5. The method of claim 1, wherein the cross-linking agent comprises polyalkyleneimine.

6. The method of claim 1, wherein the treatment fluid further comprises an aqueous fluid, wherein the aqueous fluid comprises at least one aqueous fluid selected from the group consisting of tap water, produced water, brine, seawater, and any combination thereof.

* * * * *